United States Patent [19]
Gouda

[11] Patent Number: 4,672,471
[45] Date of Patent: Jun. 9, 1987

[54] METHOD FOR STORING IN A FIRST SET OF CONSECUTIVE TRACKS A SINGLE STILL PICTURE AND IN A SECOND SET OF CONSECUTIVE TRACKS CORRESPONDING DIGITAL AUDIO WITH TRACK NUMBER INFORMATION INCLUDED THEREIN

[75] Inventor: Seiichi Gouda, Kanagawa, Japan

[73] Assignee: Sony Corporation, Tokyo, Japan

[21] Appl. No.: 606,121

[22] Filed: May 2, 1984

[30] Foreign Application Priority Data

May 11, 1983 [JP] Japan .................................. 58-80912

[51] Int. Cl.[4] .............................................. H04N 5/92
[52] U.S. Cl. .................................... 358/341; 358/342; 369/49
[58] Field of Search ............... 358/310, 320, 323, 335, 358/337, 339, 341, 342, 343; 369/47, 48, 49, 59, 120; 360/18, 32

[56] References Cited

U.S. PATENT DOCUMENTS

| 3,909,512 | 9/1975 | Omori et al. ......................... 358/343 |
| 4,065,795 | 12/1977 | Shutterly .......................... 360/32 X |
| 4,227,213 | 10/1980 | Isobe ................................. 358/343 |
| 4,317,131 | 2/1982 | Jerome ............................ 369/120 X |
| 4,352,129 | 9/1982 | Baldwin .......................... 369/59 X |
| 4,389,681 | 6/1983 | Tanaka et al. .................... 369/59 X |
| 4,413,340 | 11/1983 | Odaka et al. . |
| 4,450,488 | 5/1984 | Golding .......................... 358/343 X |
| 4,497,050 | 1/1985 | Beetstra ........................... 369/48 X |
| 4,534,031 | 8/1985 | Jewer ............................... 369/59 X |
| 4,541,093 | 9/1985 | Furuya et al. .................... 369/49 X |

Primary Examiner—Raymond F. Cardillo
Assistant Examiner—Wayne R. Young
Attorney, Agent, or Firm—Lewis H. Eslinger; Alvin Sinderbrand

[57] ABSTRACT

The video information corresponding to a still picture is recorded along a track of the video disc at a first set of preselected track locations and a digitized and compressed audio signal relating to the still picture is recorded along the track of the video disc at a second set of preselected track locations. The data amount of the audio signal in each track is equal to the first data amount within which the audio data is interleaved for error correction. At the beginning of each of the tracks of the second set of preselected track locations, track number information is recorded representing the number of tracks in which the audio signal relating to the single still picture is recorded. The data amount of the track number information is the difference between the second data amount capable of recording in each track of the second set of preselected track locations and the first data amount.

5 Claims, 10 Drawing Figures

METHOD FOR STORING IN A FIRST SET OF CONSECUTIVE TRACKS A SINGLE STILL PICTURE AND IN A SECOND SET OF CONSECUTIVE TRACKS CORRESPONDING DIGITAL AUDIO WITH TRACK NUMBER INFORMATION INCLUDED THEREIN

BACKGROUND OF THE INVENTION

1. Field of the Invention

The present invention relates generally to a method of recording information, more particularly to a method of storing a still picture video signal and an audio signal corresponding thereto on a video disc, a video disc recorded thereon with video and audio signals and a reproducing apparatus for reproducing video and audio signals from a video disc.

2. Description of the Prior Art

As a video disc apparatus of this kind, such a video disc apparatus has hitherto been proposed in which spiral-shape recording tracks are formed on a video disc, a video signal corresponding to a still picture of one frame amount is recorded on the video disc as one circular track and an audio signal (message, background music and so on) relating to the still picture is recorded on the video disc as a plurality of circular tracks adjacent to the one circular track so that at the same time when the video signal corresponding to the still picture is reproduced to monitor the still picture, the audio information corresponding thereto can also be monitored.

The still picture can be reproduced for a desired duration by driving a video head to repeatedly trace the recording track on which the video signal corresponding to the still picture of one frame is recorded. On the other hand, in order to obtain the audio information which is sufficient for practical use, an audio signal with a period of about 10 seconds is required, while the number of the recording tracks on which the audio signal is recorded must be reduced as much as possible. To solve the above problem, it is proposed in the prior art to compress PCM (pulse code modulated) audio data in time base several tens of times to have a frequency approximately the same as that of the video signal, to convert the signal to a frequency-modulated FM signal similar to the video signal, and to record the FM signal on an audio signal track. Thus, the audio signal recorded on the audio signal track is reproduced by the same video head as that for the video signal and stored temporarily in a temporary memory circuit. Accordingly, when the stored data is read out from the temporary memory circuit while the time base thereof is being expanded so as to be converted to an audio information and the video signal is repeatedly reproduced during the period in which the stored data is converted to the audio information, the still picture and the corresponding audio information can simultaneously be reproduced.

Figure 1:
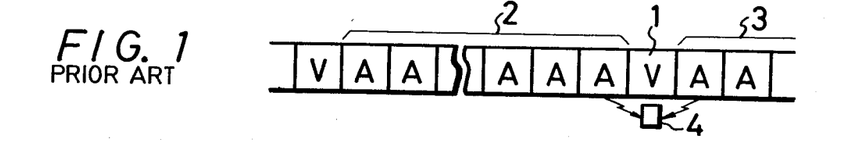
FIG. 1 is a schematic diagram showing a recorded track of a prior art video disc.

As described above, in the conventional video disc, as shown in FIG. 1, at one side of a video signal track 1 corresponding to one still picture there are adjacently located a plurality of audio signal tracks 2 along which an audio signal corresponding to the still picture is recorded on the video signal track and at the other side of the video signal track 1 corresponding to the still picture there are also adjacently located a plurality of audio signal tracks 3 along which the audio signal corresponding to the still picture of the next adjacent video signal track is recorded. And, the video signal track 1 is traced by a video head 4 to thereby reproduce the video signal recorded on the video signal track 1. As a result, when the video signal track 1 is repeatedly reproduced by the video head 4, a cross-talk from the adjacent audio signal tracks 2 and 3 appears in the reproduced output from the video head 4 so that the quality of the reproduced still picture is inevitably deteriorated. In this connection, since the signal system of the audio signal recorded on the audio signal tracks 2 and 3 is constructed substantially the same as that of the video signal recorded on the video signal track 1, the crosstalk is apt to be caused.

In the prior art, in order to reduce the number of audio signal recording tracks as much as possible, an adaptive differential PCM (simply called ADPCM) system is adopted so as to compress and to encode the audio signal. When the audio signal is encoded according to the differential PCM system as described above, if data error occurs upon decoding, such data error is inevitably accumulated. Therefore, to reduce noise, it is desired that an error correction code having a large error correction ability is used to record the audio signal. In this connection, although the bit error ratio when digital data with a video format is recorded on the video disc is usually considered to be approximately $1 \times 10^{-3}$ to $1 \times 10^{-5}$, this bit error ratio is caused to be expanded.

In addition to the above requirements, in the video disc apparatus of this kind, since the audio information amount relating to each still picture is not uniform, it is necessary that the number of the audio signal tracks on the video disc can be varied in accordance with need. Further, even though the number of the audio signal tracks on the video disc is varied, digital data must be recorded on the video disc with a format so formed that upon reproducing the audio data stored in the memory circuit is conveniently read out therefrom and processed while the time base thereof is being expanded.

OBJECTS AND SUMMARY OF THE INVENTION

Accordingly, it is an object of the present invention to provide an improved method for storing video and audio signals on a video disc.

It is another object of the present invention to provide a method of storing video and audio signals on a video disc which uses an interleave code having a large error correction ability so that crosstalk appearing from adjacent tracks upon reproducing a track of a video signal corresponding to a still picture can be reduced.

It is still another object of the present invention to provide a method of storing video and audio signals on a video disc which uses an interleave code having a large error correction ability so that even when the amount of audio information is different for each still picture, audio data corresponding thereto can easily be recorded on the video disc.

It is a further object of the present invention to provide a method of storing video and audio signals on a video disc by which even when different amounts of audio data corresponding to each still picture are reproduced from the video disc, such audio data can easily be processed by a reproducing circuit.

It is a still further object of the present invention to provide an improved video disc storing video and audio signals thereon which can obviate the defects inherent in conventional video discs.

It is a yet further object of the present invention to provide an improved reproducing apparatus for reproducing video and audio signals from a video disc which can obviate the defects inherent in conventional reproducing apparatus.

According to one aspect of the present invention, there is provided a method for storing video and audio signals on a video disc comprising the steps of:

(a) recording a video information corresponding to a still picture along a track of said video disc at a first set of preselected track location;

(b) recording a digitized and compressed audio signal relating to said still picture along the track of said video disc at a second set of preselected track location, the data amount of said audio signal in each track being equal to the first data amount within which said audio data is interleaved for error correction; and (c) recording a track number information representing the number of tracks in which said audio signal relating to the single still picture is recorded at the beginning of each of said tracks of said second set of preselected track location, the data amount of said track number information being the difference between the second data amount capable of recording in each track of said second set of preselected track location and said first data amount.

According to another aspect of the present invention, there is provided a video disc for storing video and audio signals thereon comprising:

(a) a first set of preselected track location at which same video information corresponding to a single still picture is recorded repeatedly along at least three serial tracks; and (b) a second set of preselected track location at which a digitized and compressed audio signal relating to the single still picture is recorded along a plurality of tracks, a track number information representing the number of tracks in which said audio signal relating to the single still picture is recorded being recorded at the beginning of each of said tracks at said second set of preselected track location, and the data amount of said track number information being the difference between the second data amount capable of recording in each track of said second set of preselected track location and the first data amount within said audio data is interleaved for error correction.

According to a further object of the present invention, there is provided a reproducing apparatus for reproducing video and audio signals from a video disc on which a video information corresponding to a still picture is recorded repeatedly along at least three serial tracks at a first set of preselected track location and a digitized and compressed audio signal relating to the still picture is recorded along the track at a second set of preselected track location, and a track number information representing the number of tracks in which said audio signal is recorded is recorded at the beginning of each of said tracks of said second set of preselected track location, comprising:

(a) a reading head for reading the signal recorded on said disc;

(b) a head control device for controlling the movement of said reading head;

(c) a video signal processing circuit for processing a video signal from said reading head;

(d) a muting circuit connected between said reading head and said video signal processing circuit for muting an output signal from said reading head during the digitized audio signal being read out from said disc;

(e) a memory for storing the read out audio signal and for generating a time expanded audio signal;

(f) a signal separator for separating said track number information from an output of said memory;

(g) a decoder for decoding said track number information; and (h) a memory control circuit supplied with the output of said decoder for generating a memory control signal controlling the reading out of said memory.

The other objects, features and advantages of the present invention will become apparent from the following description taken in conjunction with the accompanying drawings through which the like references designate the same elements and parts.

DESCRIPTION OF THE PREFERRED EMBODIMENTS

Figure 2:
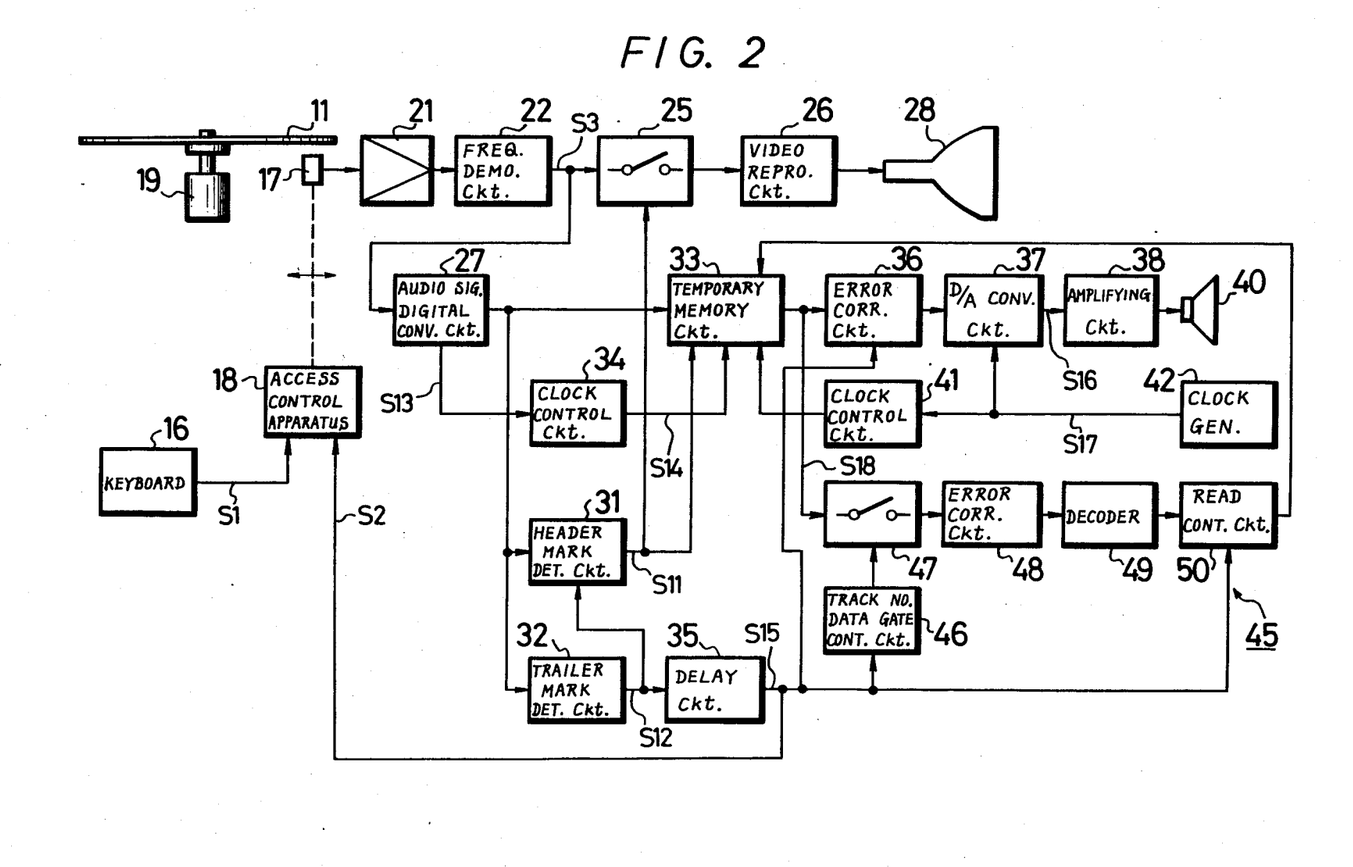
FIG. 2 is a block diagram showing a reproducing circuit to which a method of storing information on a video disc according to the present invention is applied.

Now, the present invention will hereinafter be described with reference to the drawings. FIG. 2 is a block diagram showing a reproducing circuit to which a method of storing video and audio signals on a video disc according to the present invention is applied.

Figures 3, 6:
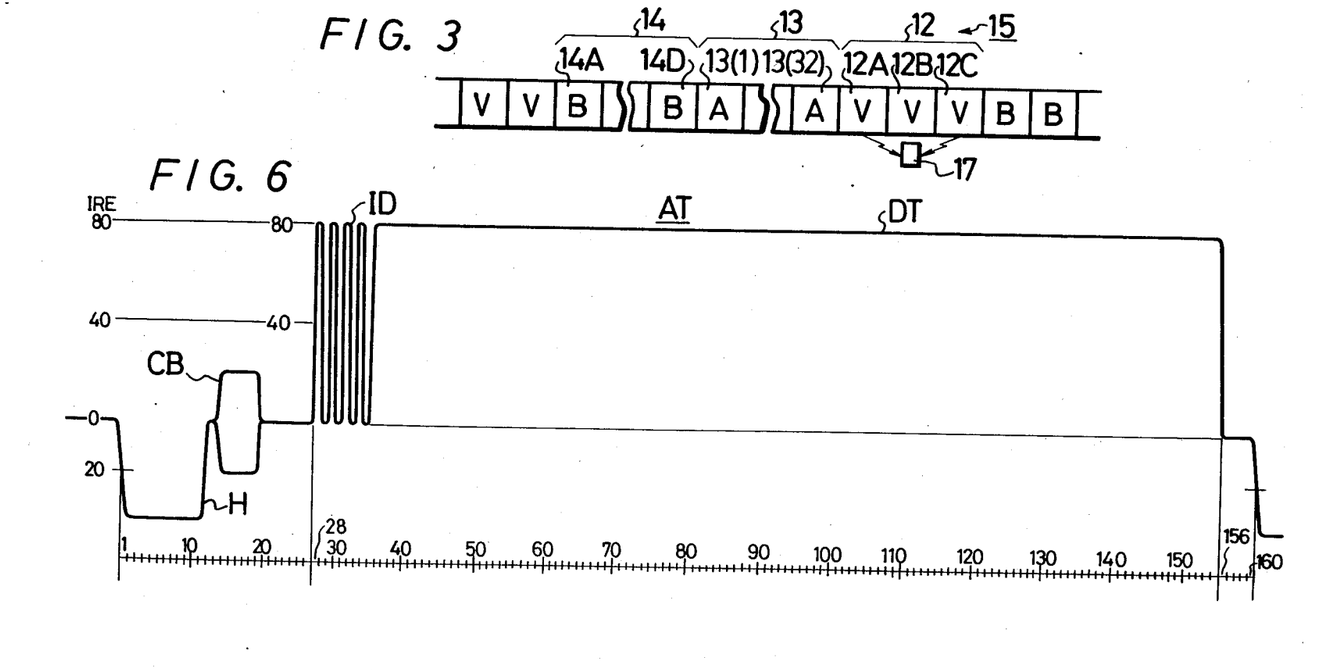
FIG. 3 is a schematic diagram showing a recorded track on the video disc reproduced by the reproducing circuit shown in FIG. 2.
FIGS. 4, 5 and 6 are respectively signal waveform diagrams showing video and audio signals corresponding to the still picture reproduced by the reproducing circuit shown in FIG. 2.

In FIG. 2, reference numeral 11 designates a video disc in which as shown in FIG. 3 a still picture video track interval 12 is formed of at least three serial tracks 12A, 12B and 12C and the same still picture video signal of one frame amount is recorded on each of the tracks 12A to 12C.

At the inside of the still picture video signal tracks 12A to 12C, there are formed an audio signal track interval 13 formed of, for example, 32 audio signal tracks 13(1) to 13(32) at the maximum and a black burst interval 14 formed of 4 black burst tracks 14A to 14D, thus a still picture video and audio information track group 15 of one unit amount being constructed. The still picture video and audio information track group 15 of one unit amount is continuously recorded on the video disc 11 along the serial spiral-shape tracks with address codes sequentially attached thereto from, for example, the inside of the serial tracks.

Turning back to FIG. 2, upon playback, when a desired address signal S1 is specified and inputted by a keyboard 16, a video head 17 is controlled in its address position relative to the radial direction of the video disc 11 by an access control apparatus 18 so that the video head 17 is driven to sequentially trace the black burst tracks 14A to 14D, the audio signal tracks 13(1) to 13(32) and the video tracks 12A to 12C corresponding to the still picture video and audio information track group 15 corresponding to the specified address.

The number of tracks in the audio signal track interval 13 is selected to correspond to each of the still pictures because the amount of audio information depends on each still picture. As a result, it is possible to sequentially change the number of the audio signal tracks 13(1) to 13(32) of the still picture video and audio information track group 15 of each unit serially formed along the spiral-shape tracks.

When the video head 17 reaches the position to trace the central track 12B of the three still picture video tracks 12A to 12C, the video head 17 is controlled in position to repeatedly trace the central track 12B by the access control apparatus 18 to which a still command signal S2 is supplied.

In this embodiment of FIG. 2, the video disc 11 is driven to rotate at speed of 30 r.p.s by a drive motor 19 and the video head 17 is formed of an optical head.

Figure 4:
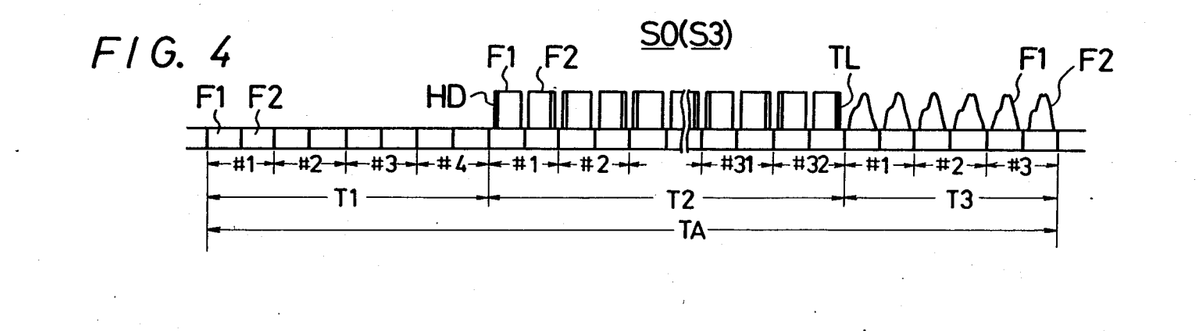

In the still picture video and audio information track group 15 of one unit amount of the video disc 11, there is recorded a still picture video and audio signal S0 of a television video signal system as shown in FIG. 4. This still picture video and audio signal S0 is reproduced by the video head 17, supplied through a playback amplifying circuit 21 and a frequency demodulating circuit 22 and then developed as a still picture video and audio reproduced signal S3.

In FIG. 4, first and second field signal portions F1 and F2 are reproduced from each one circular track. When the video head 17 traces the black burst tracks 14A to 14D (see FIG. 3), a black burst signal interval T1 formed of the horizontal and vertical synchronizing signals and the burst signal continues 4 frames. Thereafter, when the video head 17 traces the audio signal tracks 13(1) to 13(32) (see FIG. 3), an audio data interval T2 continues 32 frames at the maximum. After that, when the video head 17 traces the still picture video tracks 12A to 12C (see FIG. 3), a still picture video signal interval T3 continues 3 frames. Thus, when the video signal interval T3 is ended, the playback of a still picture video and audio signal interval TA of one unit concerning the above still picture is ended.

The video signal of 2 field amounts with the standard television signal format is recorded on each frame interval of the still picture video signal interval T3 and the contents of the still picture thereof are made equal to each other.

Figure 5:
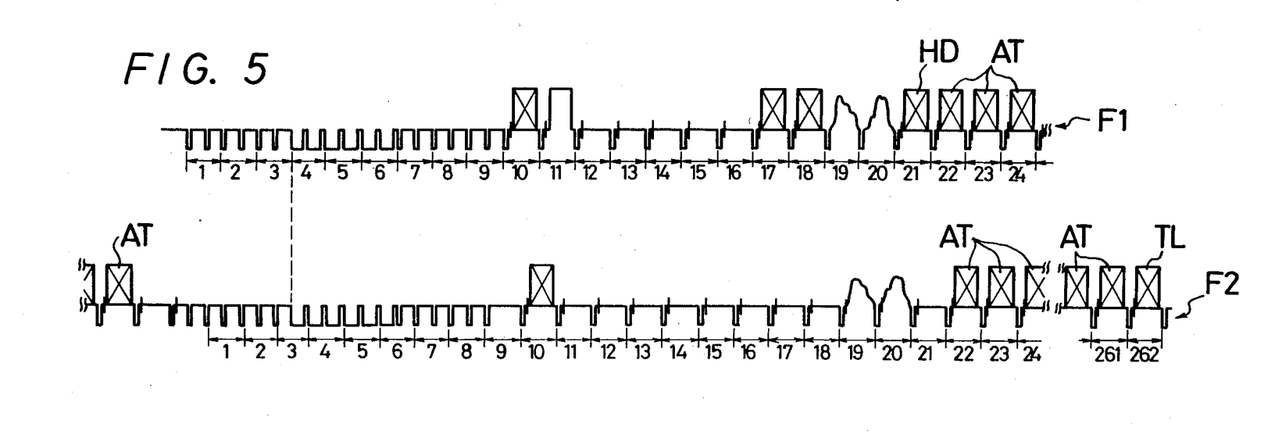

On the contrary, in each frame period of the audio data interval T2, as shown in FIG. 5, a header mark signal HD representing the beginning of the audio data can be inserted into the 21st horizontal synchronizing interval following the vertical synchronizing signal in the first field interval F1, while a trailer mark signal TL representing the end of the audio data can be inserted into the 262nd horizontal synchronizing interval just before the beginning of the vertical synchronizing signal of the next field in the second field interval F2. And, an audio data signal AT the time axis or time base of which is compressed as shown in FIG. 6 can be inserted into the remaining horizontal synchronizing signal intervals of the first and second fields F1 and F2. However, in practice, as shown in FIG. 4, in the audio data interval T2, the header mark signal HD is inserted into only the first frame and the trailer mark signal TL is inserted into only the last 32nd frame, thus representing that the interval into which the audio data is inserted is from the 1st frame to the 32nd frame (at the maximum).

The audio data signal AT in the audio data interval T2 consists of, as shown in FIG. 6, a horizontal synchronizing signal H, a color burst signal CB and an effective audio data DT. A reference signal ID of sine waveform having one cycle of 2 bit widths and changing around the ½ amplitude position is inserted into the beginning of the effective audio data DT so that upon reproducing the effective audio data DT, when the reference signal ID and the audio data DT are sliced with the ½ amplitude level, a reference logic signal can be reproduced to have a duty ratio of 50% by the reference signal ID, a reference bit width and a logic level which is alternately changed to "1" or "0". Thus, the digital value of the effective audio data DT can be reproduced without error by adjusting the amplitude of the effective audio data DT so as to make the waveform of the reference logic signal a predetermined one.

Figure 7:
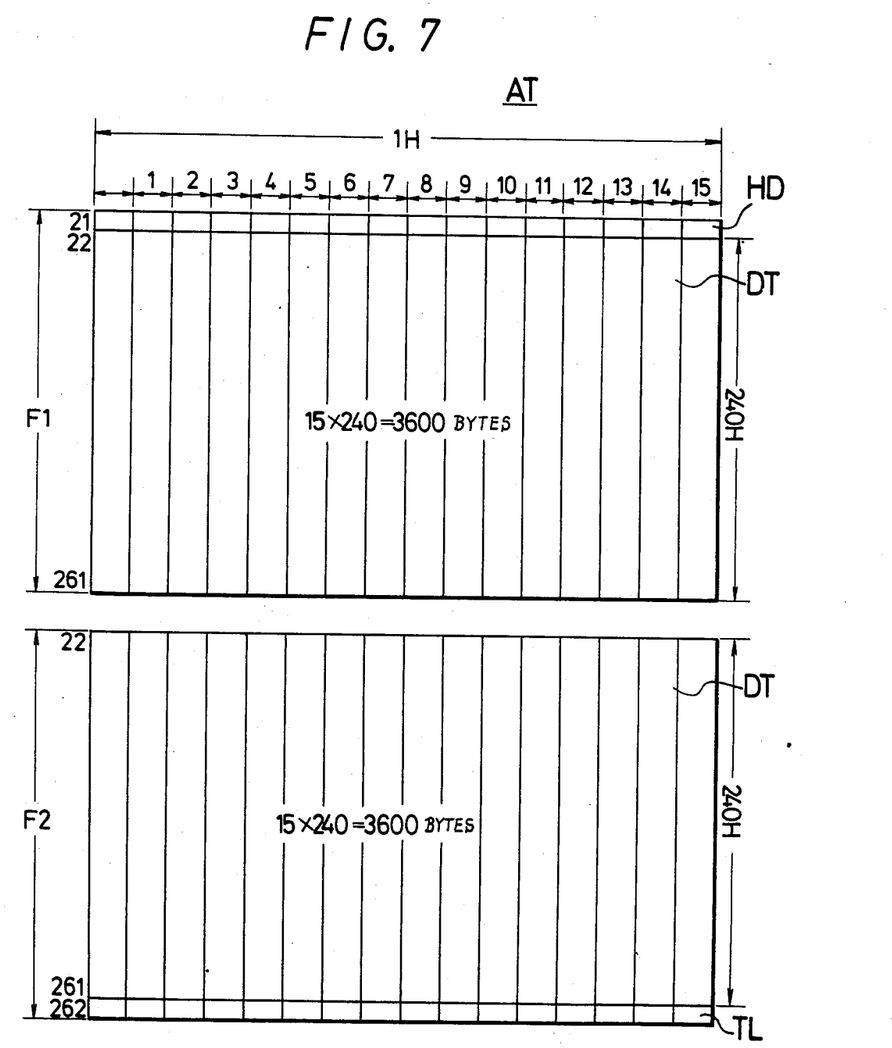
FIGS. 7 and 8 are respectively schematic diagrams showing the arrangement of the data thereof.

The effective audio data DT is selected so as to have a capacity of 15 bytes (120 bits) at every 1H interval, while the reference signal ID is selected so as to have a capacity of 1 byte (8 bits) so that as shown in FIG. 7, the data format of the audio data AT of one frame is provided at its 21st H (horizontal interval) with the data of the header mark signal HD of 15 bytes and in its interval of 240H ranging from 22nd H to 261st H with the effective audio data DT of 15 bytes each (accordingly, 15×240=3600 bytes) during the first field F1. Also during the second field F2, the above data format of the audio data AT of one frame is provided in its 240H interval ranging from 22nd H to 261st H with the effective audio data DT of 15 bytes each (accordingly, 15×240=3600 bytes) and at its 262nd H with the data of the trailer mark signal TL of 15 bytes. Thus the audio data of one frame has the data capacity of 3600×2=7.2K bytes. Since the audio data interval T2 (see FIG. 4) consists of 32 frames, the whole capacity of the audio data signal AT in the audio data interval T2 becomes 7.2×30=230.4K bytes as shown in FIG. 8.

Figure 8:
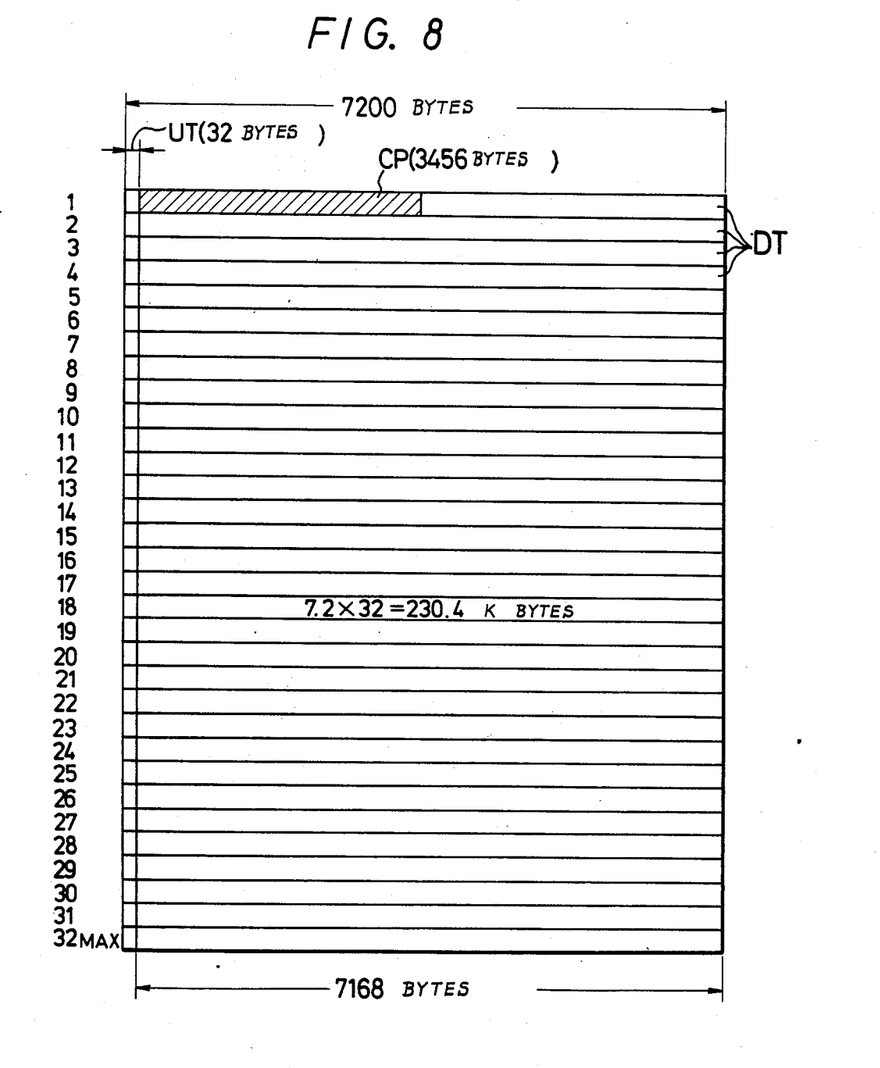

Accordingly, if the formats of data in the audio data interval T2 are constructed as shown in FIGS. 6 to 8, an audio signal of about 1.3 sec per track can be reproduced for the still picture of one frame.

In this embodiment, a control program data CP of, for example, 3456 bytes is inserted into the first frame of the audio data interval T2 as shown in FIG. 8 and this data CP is used to control the process operation of the audio data in the playback circuit.

In addition to the above arrangement, as shown in FIG. 8, a usable track number indication interval UT of a predetermined capacity is inserted into the beginning of each frame of the effective audio data DT whereby a track number data representing the number of tracks (of the video disc 11) along which the audio signal corresponding to the still picture is recorded can be inserted thereinto. In this embodiment, the capacity of the usable track number indication interval UT is selected to be 32 bytes.

Figure 9:
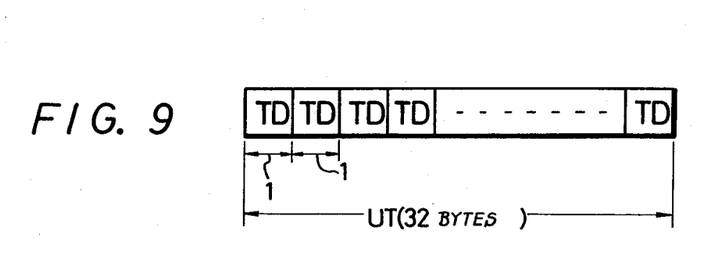
FIG. 9 is a schematic diagram showing a format of a used track number data.

In this indication interval UT, as shown in FIG. 9, track number data TD ("1" to "32") used to record byte by byte the audio signal track interval 13 is respectively recorded in the form of the binary coded decimal number. In this embodiment, the number of the tracks to be used can be selected to be "32" at the maximum. Thus it is possible to record the audio information of 1.3×32=41.6 seconds at the maximum. In addition, since the same track number data TD of one byte is repeatedly recorded up to 32 bites, the repeatedly recorded data can be read upon playback so that the error of the repeatedly recorded data can be judged by the reproducing circuit on the basis of the principle of the majority decision. Thus the error correction of the track number reproduced data can be carried out.

Turning back to FIG. 2, the still picture video and audio signal reproduced signal S3 described above is supplied through a muting circuit 25 to a video reproducing circuit 26 and also to an audio signal digital converting circuit 27. The video reproducing circuit 26 and the converting circuit 27 are operated in synchronism with each other with the signal in the black burst interval T1 of the still picture video and audio reproduced signal S3 to make a monitor 28 in a condition which can display a still picture and to present such a state where a digital signal corresponding to audio data is obtained from the audio data interval T2.

When the header mark signal HD of the audio data signal AT is thus delivered from the audio signal digital converting circuit 27, such header mark signal HD is detected by a header mark detecting circuit 31. Then, by its detected signal S11, the muting circuit 25 is then turned off to inhibit the signal S3 from being supplied from the frequency demodulating circuit 22 to the video reproducing circuit 26. This off-state is maintained until a trailer mark detecting circuit 32, when the trailer mark signal TL of the audio data signal AT is delivered from the audio signal digital converting circuit 27, detects the above trailer mark signal TL and then the header mark detecting circuit 31 is reset by its detected signal S12.

The header mark detecting signal S11 is supplied to a temporary memory circuit 33 as its write enable signal. As a result, each time the converting circuit 27 produces digital data corresponding to the 1st to 32nd frame signals (see FIG. 4) in the interval T2 following the header mark signal HD, each of the digital data is stored in the memory circuit 33. This data storing operation is carried out by a write clock pulse S14 sent from a clock control circuit 34 which is operated in synchronism with a horizontal synchronizing signal S13 derived from the converting circuit 27. As described above, the whole (32 frame amounts at the maximum) of audio data is the form of the audio digital signal system with the time base compressed is stored in the memory circuit 33.

When the memory circuit 33 ends to store the audio data AT and the detecting circuit 32 delivers the trailer mark detecting signal S12, this trailer mark detecting signal S12 is delayed by a delay circuit 35 and developed as a still picture generation starting command signal S15. The delay circuit 35 has a delay time of one frame interval (accordingly, 2 vertical synchronizing intervals) of the reproduced still picture video and audio signal S3 (see FIG. 4), so that the delay circuit 35 delivers the command signal S15 at the timing when the still picture signal of the 2nd frame in the still picture signal interval T3 (see FIG. 4) is delivered from the converting circuit 27 and supplies the same to the access control apparatus 18 as the still command signal S2. At that time, the access control apparatus 18 controls the head 17 in position to repeatedly trace the central track 12B of the still picture video signal tracks 12A to 12C (see FIG. 3) which is being traced at present.

At the same time, the still picture generation starting command signal S15 is supplied to an error correcting circuit 36. At this time, the error correcting circuit 36 sequentially reads out the audio data stored in the memory circuit 33 and carries out the error correction thereof. Then, this audio data is converted to the analog signal form of an audio signal S16 by a D/A (digital-to-analog) converting circuit 37 and the audio signal S16 is supplied through an amplifying circuit 38 to a loudspeaker 40. The read operation from the memory circuit 33 by a clock control circuit 41 and the conversion operation of the D/A converting circuit 37 are carried out in response to a clock signal S17 generated from a clock generator 42. The period of the clock signal S17 is selected sufficiently large in value as compared with the read period at which each audio data is written in the memory circuit 33. Thus, the audio data AT is read out from the memory circuit 33 in timebase expanded state and converted into the analog signal so that the audio signal with the normal frequency is supplied to the loudspeaker 40.

The error correcting circuit 36 is arranged to perform the error correction by using the interleave code having particularly large correction ability. For example, it is possible to employ the error correcting circuit disclosed in U.S. Pat. No. 4,413,340 and corresponding Japanese patent application No. 67608/1980 (Japanese unexamined patent application No. 4629/1982) as the error correcting circuit 36.

By the way, according to the interleave error correction code system, while taking transmission data of a predetermined block number as one unit, data of each block are dispersed bit by bit so as to be interleaved bit by bit to data of other blocks with one another thus the correction-coded data with the length of the predetermined block number being obtained. And then, the transmission data is decoded by re-arranging each bit of the correction-coded data into the original block. As described above, since in this error correction system the transmission data are mutually dispersed, even if the error occurs in a part of the correction-coded data over quite a wide range, the error appearing in the data of each block is quite small bit. Thus, it may be said that this error correction system has large correction ability.

In this embodiment, in the transmission data, 112 blocks, each one block being formed of data of 32 bytes, are taken as one unit and the data of one unit are interleaved to produce the correction-coded data of 112×32 bytes.

Consequently, since the principle of this interleave error correction code system is to perform the encoding and decoding with the data of the predetermined block number as one unit, it is necessary for the data of one unit to be processed so that the data formats in FIGS. 7 and 8 are so constructed as to satisfy this condition. In FIG. 8, the effective audio data DT has the data amount of 7168 bytes (=3584×2 bytes) for each frame, which fact means that the audio data DT of each frame is formed of 2 units of data amount of 3584 bytes (=32 bytes×112 block) which is taken as one unit in case of data processing operation upon error correction. Thus the error correction system having large correction ability can easily be applied to this embodiment.

The read operation condition of the memory circuit 33 in FIG. 2 is restricted by a read time limiting circuit 45 so as not to exceed a predetermined duration of time. That is, in the read time limiting circuit 45, the still picture generation starting command signal S15 is supplied to a track number data gate control circuit 46. This gate control circuit 46 so controls a gate circuit 47 that a track number data S18 of 32 bytes inserted into the first interval UT of the first frame of the audio data DT (see FIG. 8) stored in the memory circuit 33 is taken through the gate circuit 47 into an error correcting circuit 48. At that time, the error correcting circuit 48 corrects for the error of the track number data S18 repeatedly supplied thereto on the basis of the majority decision principle and then supplies the error-corrected data to a decoder 49 which specifies the stored data of the read range corresponding to the track number in a read control circuit 50 for the memory circuit 33. Thus, when the data within the specified range is read out from the memory circuit 33, the memory circuit 33 is stopped by the output from the read control circuit 50 from continuing to carry out the read operation.

With the above circuit arrangement, when the still picture of an n-th unit is specified by the keyboard 16, the access control apparatus 18 puts the head 17 at the position of the still picture video and audio signal track group 15 (see FIG. 3) of the n-th unit on the video disc 11 and drives the head 17 to start to trace the black burst tracks 14A to 14D. At that time, the black burst interval T1 of the still picture video and audio reproduced signal S3 is delivered from the frequency demodulating circuit 22 and supplied through the muting circuit 25, which is being turned on, to the video reproducing circuit 26 and the audio signal digital converting circuit 27 directly.

When the head 17 comes to trace the audio signal tracks 13(1) to 13(32), the audio data interval T2 of the still picture video and audio reproduced signal S3 is produced from the frequency demodulating circuit 22. Since the header mark signal HD is inserted into the first frame in the audio data interval T2, the header mark signal HD is detected by the header mark detecting circuit 31. This detected signal S11 turns off the muting circuit 25 and at the same time sets the memory circuit 33 in the write enable state whereby the audio data DT of 1st to 32nd frames (in this case, the data of 32 tracks are recorded on the audio data interval T2) converted in the form of digital data by the audio signal digital converting circuit 27 are stored in the memory circuit 33.

When the storing of the audio data DT is ended, this end of storing the audio data DT is detected by detecting the trailer mark signal TL inserted into its end frame by the trailer mark detecting circuit 32 and the detecting operation of the header mark detecting circuit 31 is reset by the detected signal S12, whereby when the head 17 starts to trace the still picture video and audio tracks 12A to 12C thereafter, the video signal in the still picture video signal interval T3 produced in the still picture video and audio reproduced signal S3 is supplied to the video reproducing circuit 26 thereby displayed on the monitor 28.

The detected signal S12 from the trailer mark detecting circuit 32 is delayed 2 vertical synchronizing signal interval amounts (accordingly, one frame interval amount) by the delay circuit 35 and then supplied to the access control apparatus 18 as the still command signal S2. The timing of the still command signal S2 is made coincident with the timing at which the head 17 starts to trace the central still picture video track 12B (see FIG. 3B) so that the access control apparatus 18 is set in such state that the head 17 is driven to repeatedly trace the central still picture video track 12B. Therefore, the still picture video and audio reproduced signal S3 from the frequency demodulating circuit 22 becomes the signal which is provided by repeatedly reproducing the second frame of the still picture video signal interval T3 (see FIG. 4), whereby the still picture of the n-th unit is repeatedly reproduced on the monitor 28.

Under the state that the still picture is reproduced on the monitor 28, the operation of the error correcting circuit 36 is started by the output signal S15 from the delay circuit 35 and the read operation from the memory circuit 33 is started at the cycle of the clock signal S17 derived from a clock generator 42 so that the audio data stored in the memory circuit 33 is read out with the time base thereof being expanded, converted by the D/A converter 37 and then emanated from the loudspeaker 40 as the audio information.

Accordingly, it becomes possible to view the still picture on the monitor 28, while hearing the audio information from the loudspeaker 40.

At the same time, the output signal S15 from the delay circuit 35 is supplied to the track number data gate control circuit 46 in the read time limiting circuit 45 to open the gate circuit 47. Since this timing is the same as that at which the reading of the audio data DT of the first frame in the audio data interval T2 stored in the memory circuit 33 is started, the usable audio data track number data (FIG. 8) inserted into the start region UT of the first frame is latched through the gate circuit 47. Accordingly, the read control circuit 50 controls the memory circuit 33 to read therefrom the audio data DT corresponding to the usable audio data track number (in this embodiment, 32 tracks (see FIG. 3)) and restricts the memory circuit 33 from performing the read operation therefrom after the read operation is ended.

As described above, the audio information recorded on the video disc 11 along the audio signal track 13 with the time base being compressed can sufficiently be reproduced so that the still picture together with the audio information thereof can be monitored for the duration of period corresponding to the audio signal of 32 tracks (namely, $1.3 \times 32 = 41.6$ seconds).

Next, when a still picture having the different usable audio track number (for example, "10" tracks) is specified by the keyboard 16, the audio data of 10 track amounts is recorded through the audio signal digital converting circuit 27 to the memory circuit 33 in the same way as in the above case. At that time, the track number data having the content representing the track numbers "10" is latched in the read time control circuit 45 by which the data corresponding to the above track number data is read out from the memory circuit 33 and the data other than the above is restricted from being read out from the memory circuit 33. Consequently, the read time limiting circuit 45 operates so that even if the undesired data is stored in the memory circuit 33, the data written in the memory circuit 33 this time can be positively read out therefrom without being affected by such undesired data. Thus the still picture together with the audio information can be monitored for the duration of period corresponding to the audio signal of "10" track amounts (namely, $1.3 \times 10 = 13.0$ seconds).

Figure 10:
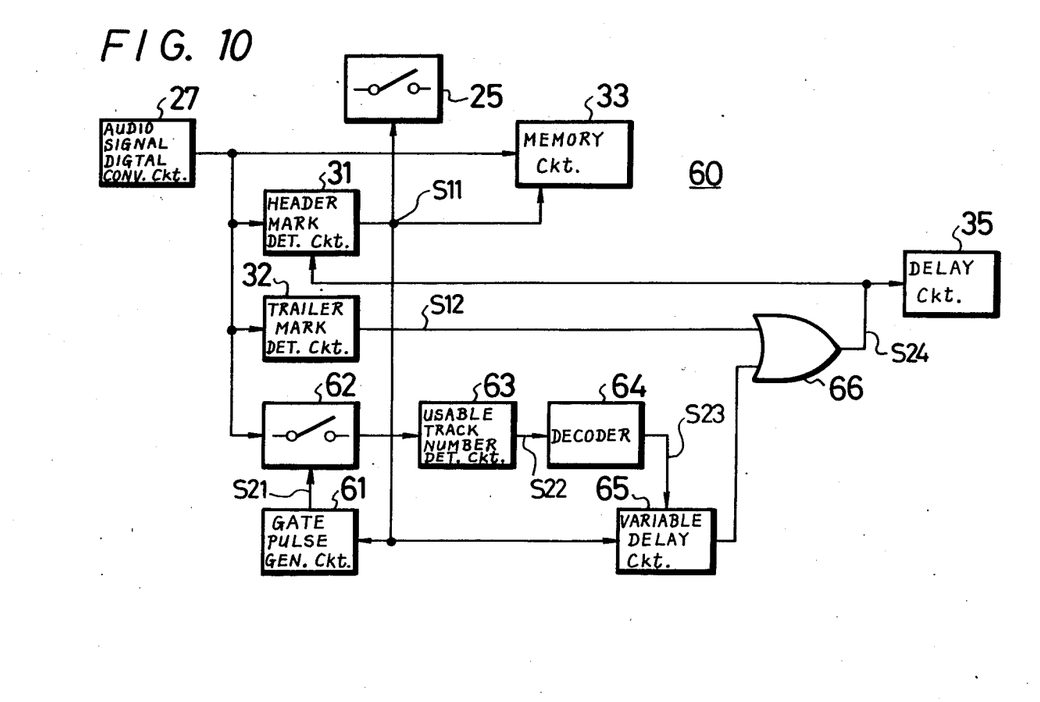
FIG. 10 is a block diagram showing a circuit arrangement to which another embodiment of the method for storing video and audio signals on a video disc according to the present invention is applied.

While in the above embodiment, the data in the usable track number data interval UT (see FIG. 8) is used to restrict the read time of the memory circuit 33 by the read time limiting circuit 45, in addition thereto such data can also be used to control a back-up circuit 60 for the trailer mark detecting circuit 32 as shown in FIG. 10. In FIG. 10, like parts corresponding to those in FIG. 2 are marked with the same references. The detected signal S11 of the header mark detecting circuit 31 is supplied to a gate pulse generating circuit 61 and a gate pulse signal S21 therefrom opens a gate circuit 62. Then, the data in the usable track number data interval UT of the first frame (see FIG. 4) of the audio signal interval T2 is supplied through the gate circuit 62 to a usable track number detecting circuit 63. A detected signal S22 therefrom corresponds to the number of the tracks to be used and is varied by a decoder 64 to a variable control signal S23 for a variable delay circuit 65 so that the delayed amount of the variable delay circuit 65 becomes a value corresponding to the number of tracks to be used.

The variable delay circuit 65 is supplied with the detected signal S11 from the header mark detecting circuit 31 in which the detected signal S11 is delayed by the delay time corresponding to the number of tracks to be used and then delivered through an OR circuit 66 as an audio terminal detecting signal S24. The OR circuit 66 is also supplied with the detected output S12 from the trailer mark detecting circuit 32 and this detected output S12 is supplied through the OR circuit 66 as the audio terminal detecting signal S24, too.

With the circuit arrangement in FIG. 10, when the trailer mark signal TL is delivered after the header mark signal HD is delivered from the audio signal digital converting circuit 27, if the trailer mark detecting circuit 32 correctly carries out its detecting operation, the detected signal S12 therefrom is supplied through the OR circuit 66 to the delay circuit 35 as the audio terminal detecting signal S24 whereby the head 17 is driven to repeatedly trace the second still picture video signal track 12B.

When the trailer mark detecting circuit 32 is misoperated and does not produce the trailer mark detected signal S12, the audio terminal detected signal S24 is delivered through the variable delay circuit 65 and the OR circuit 66 at the timing in which the head 17 is substantially driven to repeatedly trace the second still picture video signal track 12B to thereby back up the mis-operation of the trailer mark detecting circuit 32. In other words, the data in the usable track number data interval (see FIG. 8) at the beginning of the effective audio data DT is supplied through the gate circuit 62, which is opened by the gate pulse S21 from the gate pulse generating circuit 61 operating in response to the detected output S11 from the header mark detecting circuit 31, to the usable track number detecting circuit 63 so that the delay amount of the variable delay circuit 65 is controlled to equal to the value corresponding to the number of the tracks to be used. Thus, the detected output S11 from the header mark detecting circuit 31 is delayed substantially to the timing at which the trailer mark signal TL is produced (this trailer mark signal TL is generated at timing of the last frame of the audio data interval T2, accordingly, at timing delayed by time corresponding to the number of the tracks to be used) and then delivered through the OR circuit 66 as the audio terminal detecting signal S24.

As set forth above, according to the circuit arrangements shown in FIGS. 2 and 10, since such data format is used in which the track number data is inserted into the usable track number data interval UT (see FIG. 8) formed at the beginning of the effective audio data DT, it is possible to provide the signal representing the audio data amount to be decoded before the reproducing circuit initiates the decoding operation. With such signal, it is possible to form the timing signal which is effective for reproducing the still picture video signal of the reproducing circuit and the audio signal corresponding to the video signal. To this end, the usable track number data can be inserted while matching the data format necessary for the error correcting circuit 36 with the data format necessary for the recording on the video disc 11. In this connection, the following conditions are required that digital information of the amount corresponding to the audio information playback time necessary for the format of the audio data can be recorded, the audio information can easily be increased and/or decreased in accordance with the contents of the still picture (can be increased and/or decreased with the unit of track) and the data of each track is formed of one byte unit. In the above embodiment, in order to satisfy these conditions, as shown in FIG. 7, by recording the data of 480H (=240 H×2 fields) with 15 bytes per 1H interval on one frame (namely, one track), the data format is formed which has data amount of 7200 bytes (=15 bytes×480).

As set forth, the data structure shown in FIGS. 7 and 8 has, as the data format for the recording the video disc 11, the data amount of 7200 bytes per one frame, while as the data format for the error correction of the audio signal upon reproducing, the data amount of 7168 bytes per one frame. And, also the data of 32 bytes is inserted into the portion of the data amount of the video disc 11 which is unnecessary for the error correction. As a result, it is possible to obtain a format by which the recording of the audio signal data and the usable track number data on the video disc and the error correction upon playback can smoothly be realized.

As set forth above, according to the present invention, it is possible to obtain the format by which the usable track number data, which can be used upon playback, is recorded on the video disc with the conditions of the recording format of the audio signal on the video disc and the error correction format upon reproducing being satisfied.

The above description is given on the preferred embodiments of the invention, but it will be apparent that many modifications and variations could be effected by one skilled in the art without departing from the spirits or scope of the novel concepts of the invention, so that the scope of the invention should be determined by the appended claims only.

I claim as my invention:

1. A method of storing video and audio signals on a video disc comprising the steps of:
   recording video information corresponding to a singal still picture along at least three consecutive tracks of said video disc;
   recording a digitized and compressed audio signal relating to said still picture on said video disc at a second set of preselected track locations; the amount of data in said audio signal in each track location being equal to a first amount of data within which said audio data is interleaved for error correction; and
   recording track number information representing the number of tracks in which said audio signal relating to the single still picture is recorded at the beginning of each of said tracks of said second set of preselected track locations, the amount of data in said track number information being the difference between the amount of data capable of being recorded in each track of said second set of preselected track locations and said first data amount.

2. A method according to claim 1, wherein a header mark signal is recorded at the beginning portion of the first track for the audio signal relating to the single still picture.

3. A method according to claim 1, wherein an end mark signal is recorded at the end portion of the last track for the audio signal relating to the single still picture.

4. A video disc for storing video and audio signals thereon comprising:
- a first set of preselected track locations at which the same video information corresponding to a single still picture is recorded repeatedly along at least three consecutive tracks; and
- a second set of preselected track locations at which a digitized and compressed audio signal relating to the single still picture is recorded along a plurality of tracks, track number information representing the number of tracks in which said audio signal relating to the single still picture is recorded being recorded at the beginning of each of said tracks at said second set of preselected track locations, and the amount of data in said track number information being the difference between the amount of data capable of being recorded in each track of said second set of preselected track locations and the amount of recorded audio data within which said audio data is interleaved for error correction.

5. Apparatus for reproducing video and audio signals from a video disc on which video information corresponding to a single still picture is recorded repeatedly along at least three consecutive tracks at a first set of preselected track locations and a digitized and compressed audio signal relating to the still picture is recorded along tracks at a second set of preselected track locations and track number information representing the number of tracks in which said audio signal is recorded is recorded at the beginning of each of said tracks of said second set of preselected track locations, comprising:
- a reading head for reading the signal recorded on said disc;
- a head control device for controlling the movement of said reading head;
- a video signal processing circuit for processing a video signal from said reading head;
- a muting circuit connected between said reading head and said video signal processing circuit for muting an output signal from said reading head while the digitized audio signal is read out from said disc;
- a memory for storing the read out audio signal and for generating a time expanded audio signal;
- a signal separator for separating said track number information from an output of said memory;
- a decoder for decoding said track number information; and
- a memory control circuit supplied with the output of said decoder for generating a memory control signal controlling the reading out of said memory.

* * * * *